United States Patent
Belanger, Jr. et al.

(10) Patent No.: US 6,485,047 B2
(45) Date of Patent: Nov. 26, 2002

(54) SELF-RETAINING AUTOMOTIVE AIRBAG PLATE

(75) Inventors: Thomas D. Belanger, Jr., Saline, MI (US); Gerald W. Stull, Adrian, MI (US); Kelvin J. Bennett, Tecumseh, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 123 days.

(21) Appl. No.: 09/803,858

(22) Filed: Mar. 12, 2001

(65) Prior Publication Data

US 2002/0125699 A1 Sep. 12, 2002

(51) Int. Cl.[7] ............................................... B60R 21/16
(52) U.S. Cl. ..................... 280/728.2; 280/732
(58) Field of Search ............................ 280/728.2, 728.3, 280/732; 292/19, 20, 21, DIG. 65; 411/525, 526, 527, 338, 339

(56) References Cited

U.S. PATENT DOCUMENTS

| | | | | |
|---|---|---|---|---|
| 5,419,583 A | * | 5/1995 | Sakakida et al. | 280/728.2 |
| 5,613,701 A | * | 3/1997 | Bentley | 280/728.2 |
| 5,651,562 A | * | 7/1997 | Hagen et al. | 280/728.2 |
| 5,765,862 A | * | 6/1998 | Bentley et al. | 280/728.2 |
| 5,813,693 A | * | 9/1998 | Gordon et al. | 24/297 |
| 5,947,509 A | * | 9/1999 | Ricks et al. | 24/662 |
| 6,070,901 A | * | 6/2000 | Hazell et al. | 280/728.3 |
| 6,193,271 B1 | * | 2/2001 | Shimane | 280/728.2 |
| 6,250,669 B1 | * | 6/2001 | Ohmiya | 280/728.2 |

* cited by examiner

*Primary Examiner*—Paul N. Dickson
*Assistant Examiner*—L. Lum
(74) *Attorney, Agent, or Firm*—John E. Kajander, Esq.

(57) ABSTRACT

An airbag plate for use in an airbag assembly incorporates a protruding push retainer feature to irreversibly secure the airbag plate to an instrument panel upper. The protruding push retainer feature may use a plurality of contact arms or an upwardly exposed flange region, with or without barbs, as a positive retaining feature. The instrument panel upper is coupled to the airbag plate by inserting a raised boss on the engine side of the instrument panel upper through a corresponding protruding push retainer contained on the airbag plate. This push retainer feature then bites into the boss to aid in preventing the airbag plate from separating from the instrument panel upper when an airbag is deployed.

20 Claims, 3 Drawing Sheets

SELF-RETAINING AUTOMOTIVE AIRBAG PLATE

TECHNICAL FIELD

The present invention relates generally to airbag systems and more particularly to a self-retaining automotive airbag plate.

BACKGROUND

The airbag plate is a ridge element that is placed between an undeployed airbag and the skin of an instrument panel. In some recent developments, the airbag plate formed from aluminum that is mounted onto the inside surface of a polypropylene skin, commonly referred to as an "upper." The mounting of the airbag plate typically involves the rolling over of plastic bosses, which have been molded into the upper, forming a button cap which retains the airbag plate. Sonic and heat stake forming are typically used to roll the plastic bosses.

There are several problems identified with present methods for attaching the airbag plate to the upper. These include, for example, variations in time and dwell of energy, variations in wall thickness due to drafting of the molded parts, variation in plastic boss height due to styling contours in the polypropylene skin, and the ability of the plastic boss to absorb the forming energy due to the closeness of the metal plate all impact the creation of the button cap.

Further, the process for forming the button cap requires that the instrument panel Upper, which typically exceeds 50 inches, be placed within an apparatus to roll the bosses, a restrictive process requiring plant floor space and excess time. Finally, since the plastic bosses are formed integral to the instrument panel upper, there is the possibility that the IP upper may be scraped due to an incorrectly formed boss.

It is therefore highly desirable to provide a method for mounting the airbag plate onto the surface of the instrument panel skin without the need to form plastic bosses.

SUMMARY OF THE INVENTION

It is thus an object of the present invention to provide a method for mounting the airbag plate onto the surface of the instrument panel skin without the need to form plastic bosses.

The above object is accomplished by providing a modified airbag plate that incorporates a push retainer feature. The airbag plate is secured to the instrument panel upper by forcing the airbag plate over the bosses and retaining it with a push retainer.

The process for retaining the airbag plate to the boss therefore does not require preforming the part for retention. Also, the present invention does not restrict the design of the polypropylene skin to an even-walled circular boss.

Other objects and advantages of the present invention will become apparent upon considering the following detailed description and appended claims, and upon reference to the accompanying drawings.

DESCRIPTION OF THE PREFERRED EMBODIMENT(S)

Figure 1:
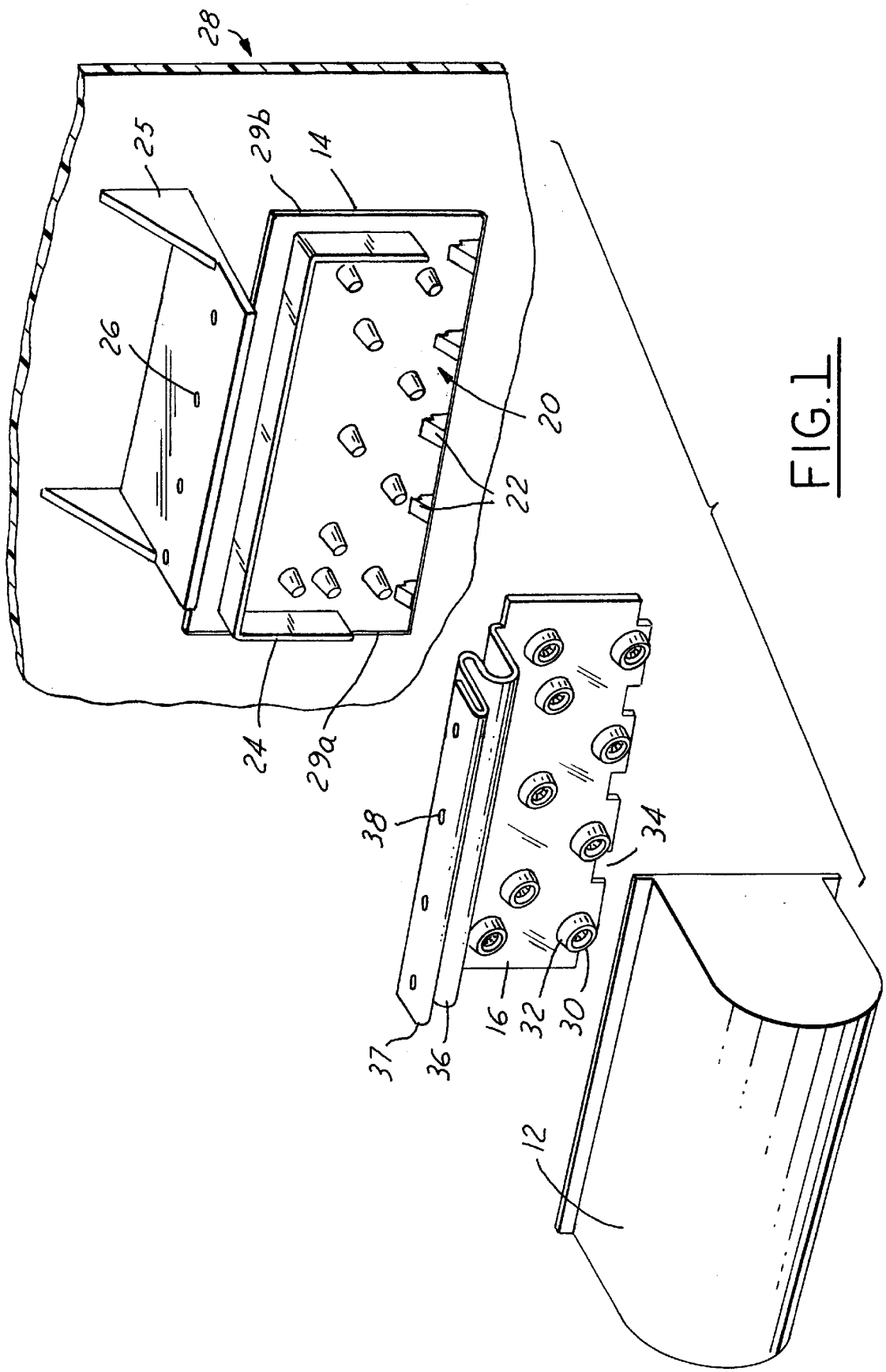
FIG. 1 is an exploded view of an airbag assembly according to a preferred embodiment of the present invention.

Referring now to FIG. 1, an exploded view of an airbag assembly 10 is depicted having an airbag canister 12, an instrument panel upper, or "IP upper" 14, and an airbag plate 16.

The IP upper 14 is designed with a plurality of attachment points, or bosses 18, on its engine side surface 20. The bosses 18 are typically hollow to prevent sink marks on the finished surface of the IP upper 14, however they can be solid if finish is not a concern. While the preferred embodiment has nine bosses 18, it is understood that the number of bosses 18 may increase or decrease depending and still fall within the spirit of the present invention. Also located on the engine side surface 20 is a plurality of clips 22, a flange 24, and a second flange 25 having a plurality of screw holes 26. While the second flange 25 is shown in FIG. 1 as a portion of the IP upper 14, the second flange 25 may alternatively be a separate piece on the vehicle (not shown). The location of the clips 22 is preferably opposite the hinge point 27 of the upper edge of the airbag plate 16, but in alternate applications may be located along either of the sides 29a, 29b of the airbag plate 16. The IP upper 14 is preferably composed of polypropylene that has a finished look and feel on its driver side surface 28.

The airbag plate 16 is preferably composed of aluminum and has a plurality of push retainer regions 30 for irreversibly mating with each of the bosses 18. The plate 16, in alternative embodiments, may also be made from other stamped metals such as cold rolled steel or may be molded from a plastic material such as 30% glass-filled polybutyl terephthalate ("PBT", also known commercially as Valox). The regions 30 each has a molded-in push retainer 32 that is described in further detail below in FIG. 2. The airbag plate 16 also has a plurality of clip retention areas 34 for mating with each of the clips 22, a grooved surface 36 that mates with the flange 24, and a second grooved surface 37 that mates with the second flange 25. The second grooved surface 37 also preferably has a plurality of screw holes 38.

Of course, while the preferred embodiment of the airbag plate 16 as in FIG. 1 shows a particular arrangement of the clip retention areas 34, grooved surface 36, and second grooved surface 37, it is specifically contemplated that the airbag plate 16 may be designed and arranged in a multitude of different ways and with a variety of other types of retention methods as is contemplated by a person of ordinary skill in the art and still be within the spirit of the present invention. Similarly, the IP upper 14 may have a multitude of possible arrangements of flanges and clips that correspond to the airbag plate 16 and fall within the spirit of the present invention.

Figure 2:
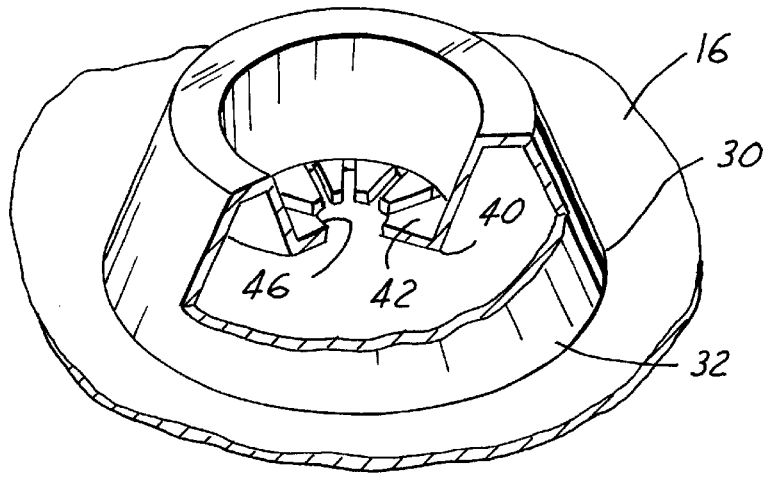
FIG. 2 is a perspective view of the push retainer of FIG. 1.

Referring now to FIG. 2, a close-up view of push retainer protrusions 32 is depicted as having a circular base 40 and a plurality of contact arms 42 set at an angle $\alpha$ (shown on FIG. 4) upward from the circular base 40 when attached to the boss. Preferably, this angle $\alpha$ is between ten and thirty degrees relative to a horizontal line extending from the circular base 40. The angle $\alpha$ is dependent upon the material used and the strength characteristics of the material used in the airbag plate 16. In addition, this angle α is dependent upon the length of the contact arms 42. Of course, the shape of the circular base 40 is designed to mimic the design of the boss 18. The inner diameter 44 defined by the ends 46 of the contact arms is designed to be slightly smaller than the diameter of the boss 18. The outer diameter 48, defined at the connection point between the contact arms 42 and the circular base 40, is designed to be slightly larger than the diameter of the boss 18. This ensures that the boss 18 fits within the outer diameter 48 yet is retained by the ends 46 the contact arms 42 as the airbag (not shown) is deployed from the airbag canister 12.

Figure 2A:
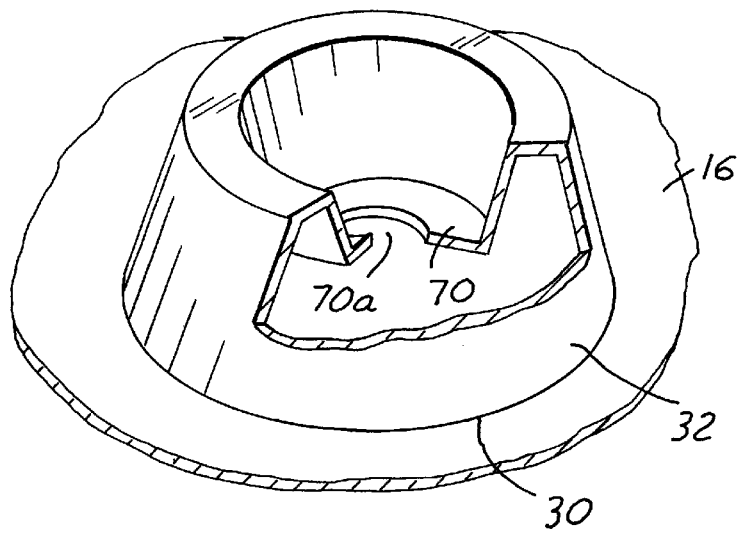
FIG. 2A shows a top view of an airbag plate having an alternative preferable arrangement for securing the airbag plate to a boss of the IP upper.
Figure 2B:
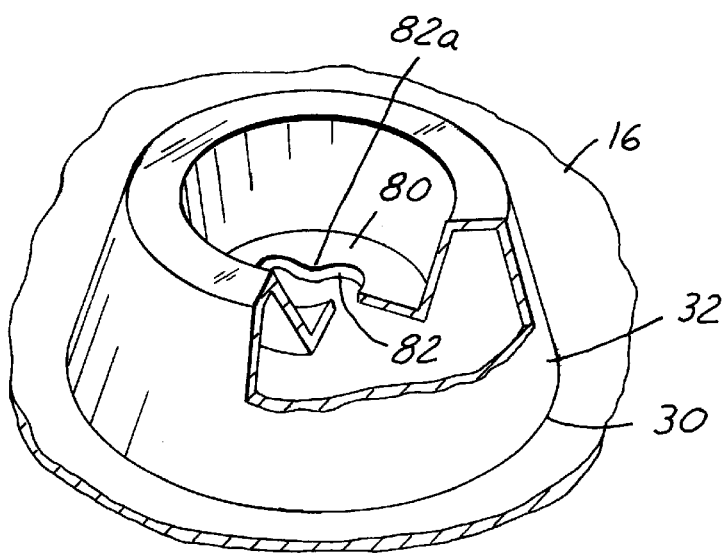
FIG. 2B shows a top view of an airbag plate having another alternative preferable arrangement for securing the airbag plate to a boss of the IP upper.

FIGS. 2A and 2B show top views of an airbag plate having alternative push retainer regions using an raised aperture flange to replace the use of a plurality of contact arms 42 to secure the boss 18 to the airbag plate 16.

In FIG. 2A, the airbag plate 16 is stamped to contain a sharp edged flange 70 protruding upwardly at an angle α from the circular base 40 when attached to the boss 18, wherein a sharp edge hole 70a having a diameter slightly less than the outer diameter of a corresponding boss 18. Preferably, this angle α is between ten and thirty degrees relative to a horizontal line extending from the circular base 40. The angle α is dependent upon the material used and the strength characteristics of the material used in the airbag plate 16. In addition, this angle a is dependent upon the length of the flange 70. The flange 70 will cut into the boss 18 as the airbag is deployed. This ensures that the boss 18 remains above the airbag plate 16 when the airbag is deployed.

In FIG. 2B, the airbag plate 16 is stamped with a star shaped flange 80 having a plurality of barbs 82 protruding inwardly. As in FIG. 2A, the flange 80 protrudes upwardly at an angle α from a circular base 40 when attached to the boss 18. Preferably, this angle α is between ten and thirty degrees relative to a horizontal line extending from the circular base 40. The angle α is dependent upon the material used and the strength characteristics of the material used in the airbag plate. The diameter defined by the inner edge 82a of the barbs 82 is such to form a hole having a diameter slightly less than the outer diameter of the corresponding boss 18, thereby cutting into the boss 18 as the airbag is deployed. This ensures that the boss 18 remains above the airbag plate 16 during airbag deployment. Of course, the number of barbs 82 may be varied to retain the bosses 18 and still be within the spirit of this invention. Also, the length of individual barbs 82 contained on a single flange 80 may varied as well and still be within the spirit of this invention.

Figure 3:
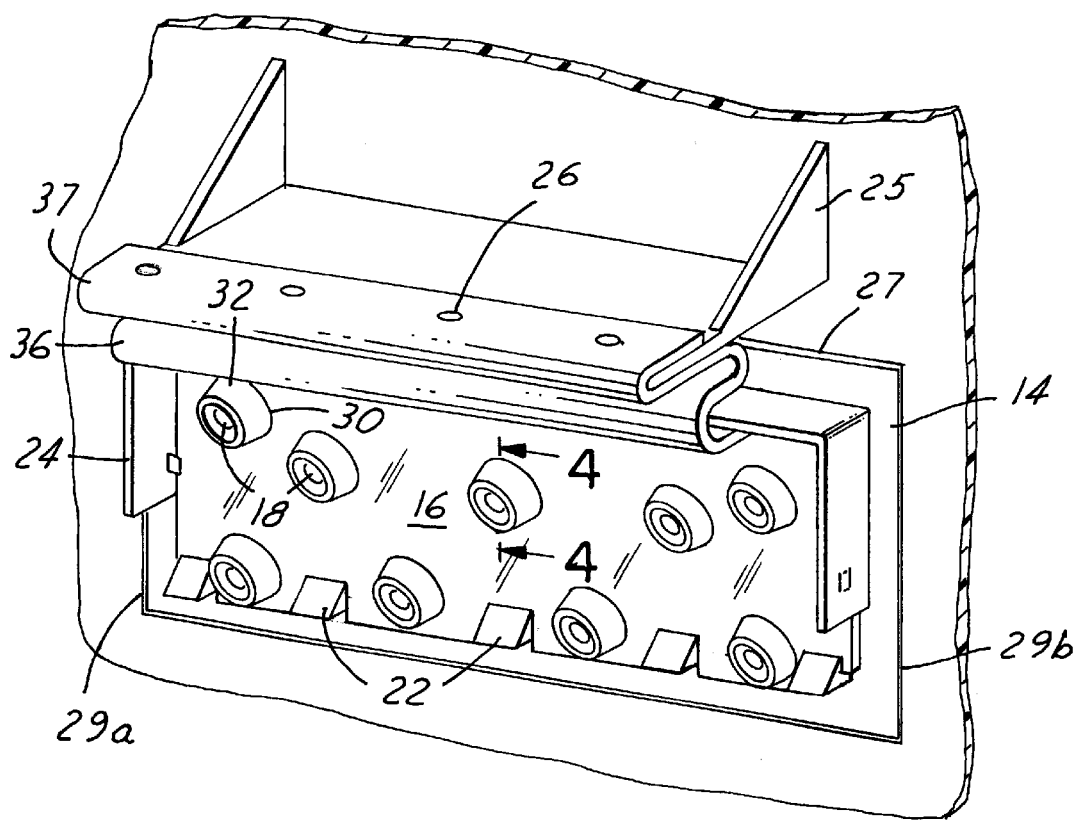
FIG. 3 is a perspective view of FIG. 1 showing the airbag plate attached to the instrument panel upper.

As shown in FIG. 3, the IP upper 14 is attached to the airbag plate 16 by inserting each of the bosses 18 into the respective corresponding protrusion 30 such that each of the contact arms 42 is pinched against the side walls 50 of the bosses 18 and wherein the flange 24 and second flange 25 is contained within the grooved region 36 and grooved region 37, respectively, and wherein each of the clips 22 are coupled within their respective clip retention areas 34. A screw (not shown) is then placed through each set of respective screw holes 26 and 38 to secure the second flange 25 of the IP upper 14 to the airbag plate 16. The number and location of the screw holes 26, 38 may be varied depending upon the fastening requirements of the system. Further, the fasteners are not limited to screws 52, but may be any other type of fastener reasonably contemplated within the art. Further, the airbag plate 16 and IP upper 14 may be secured together using glue or some other type of securing means as is contemplated within the art. The air bag canister 12 may then be attached to the airbag plate 16 by conventional means and placed within a location within the instrument panel dashboard (not shown).

Figure 4:
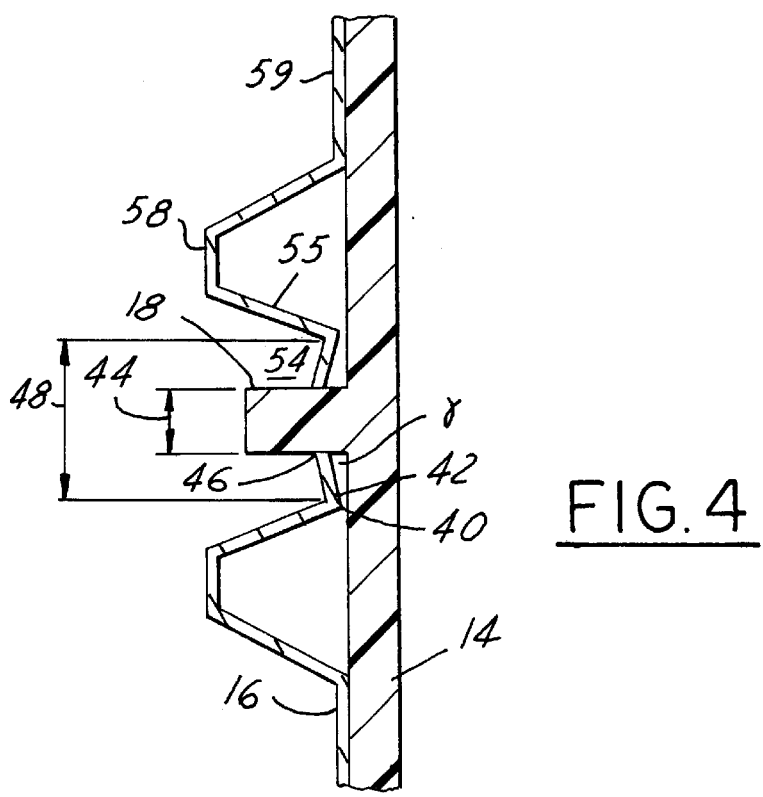
FIG. 4 is a side view taken along line 4—4 of FIG. 3.

When assembled, as best seen in FIG. 4, an attachment nest 54 is formed between each boss 18, the contact arm 42, and the sidewall region 55 of the respective airbag plate 16. The attachment nest 54 is an important component of the present invention. As the attached airbag (not shown) deploys in impact situations, the surface of the airbag will not impact the retention area 56 formed between the boss 18 and the contact arms 42, but will instead impact the raised flat region 58 and flat region 59 of the airbag plate 16. This helps to prevent focused force on the sharp retention area 56 that may tear the compliant airbag upon deployment. As the airbag deploys further, the airbag plate 16 and IP upper will be expelled outward along the hinge point 27 and move to a position out of the way to allow the airbag to inflate completely to protect passengers.

The present invention overcomes many of the problems associated with presently available art for securing an airbag plate to an IP upper and for forming the attachment means.

First, the present invention overcomes many problems commonly associated with attaching the airbag plate, many of which are related to the creation of a button cap. These variables include variations in time and dwell of energy, variations in wall thickness due to drafting of the molded parts, variation in plastic boss height due to styling contours in the polypropylene skin, and the ability of the plastic boss to absorb the forming energy due to the closeness of the metal plate.

Further, the process for forming the button cap requires that the instrument panel upper, which typically exceeds 50 inches, be placed within an apparatus to roll the bosses, a restrictive process requiring plant floor space and excess time.

Finally, since the plastic bosses are typically formed integral to the IP upper, there is the possibility that the IP upper may be scraped due to an incorrectly formed boss. The present invention reduces this risk, as the boss 18 itself may have molding variations relating to thickness or height and still be able to be retained by either the contact arms 42, the aperture 70, or the star shaped aperture 80.

While the invention has been described in terms of preferred embodiments, it will be understood, of course, that the invention is not limited thereto since modifications may be made by those skilled in the art, particularly in light of the foregoing teachings.

What is claimed is:

1. An airbag plate comprising:
   a grooved region for securing the airbag plate to an instrument panel upper flange of an instrument panel upper;
   at least one raised flat region;
   a flat region between a grooved surface and said at least one raised flat region; and
   a push retainer region within one said at least one raised flat region, said push retainer region capable of being irreversibly coupled with a corresponding boss on said instrument panel upper.

2. The airbag plate of claim 1, wherein said push retainer region comprises:
   a base region;
   a sidewall region between said base region and said one of said at least one raised flat region;
   a plurality of contact arms raised upwardly and inwardly from said base region at a first angle relative to a horizontal axis defined by said base region, a first end of each of said plurality of contact arms defining a hole having a first diameter, wherein the diameter of said corresponding boss is sized slightly larger than said first diameter.

3. The airbag plate of claim 1, wherein said push retainer region comprises:
a base region;
a sidewall region between said base region and said one of said at least one raised flat region;
a flange raised upwardly and inwardly from said base region at a first angle relative to a horizontal axis defined by said base region, said flange having a hole within said flange having a first diameter, wherein said first diameter is sized slightly smaller than the diameter of said corresponding boss.

4. The airbag plate of claim 1, wherein said push retainer region comprises:
a base region;
a sidewall region between said base region and said one of said at least one raised flat region;
a flange raised upwardly and inwardly from said base region at a first angle relative to a horizontal axis defined by said base region, said flange having a plurality of barbs at a first end opposite said base region, the end of said barbs defining a hole within said flange having a first diameter, wherein said first diameter is sized slightly smaller than the diameter of said corresponding boss.

5. An airbag assembly comprising:
an airbag canister having an airbag;
an instrument panel upper having at least one raised boss on an engine side surface; and
an airbag plate between said airbag canister and said instrument panel upper, said airbag plate being formed from a first material and having a push retainer region contained within each one of at least one raised flat regions, wherein each of said push retainer regions corresponds to an irreversibly mates with one of said at least one raised bosses when said airbag plate is coupled with said instrument panel upper.

6. The airbag assembly of claim 5, wherein said push retainer region comprises:
a base region;
a sidewall region between said base region and one of said at least one raised flat regions;
a plurality of contact arms raised upwardly and inwardly from said base region at a first angle between approximately ten and thirty degrees relative to a horizontal axis defined by said base region, a first end of each of said plurality of contact arms defining a hole having a first diameter, wherein the diameter of said corresponding boss is sized slightly larger than said first diameter.

7. The airbag assembly of claim 5, wherein said push retainer region comprises:
a base region;
a sidewall region between said base region and one of said at least one raised flat regions;
a flange raised upwardly and inwardly from said base region at a first angle between approximately ten and thirty degrees relative to a horizontal axis defined by said base region, said flange having a hole within said flange having a first diameter, wherein said first diameter is sized slightly smaller than the diameter of said corresponding boss.

8. The airbag assembly of claim 5, wherein said push retainer region comprises:
a base region;
a sidewall region between said base region and one of said at least one raised flat regions;
a flange raised upwardly and inwardly from said base region at a first angle between approximately ten and thirty degrees relative to a horizontal axis defined by said base region, said flange having a plurality of barbs at a first end opposite said base region, the end of said barbs defining a hole within said flange having a first diameter, wherein said first diameter is sized slightly smaller than the diameter of said corresponding boss.

9. The airbag assembly of claim 5, wherein said first material is selected from the group consisting of a stamped metal and a molded plastic.

10. The airbag assembly of claim 9, wherein said stamped metal is stamped aluminum.

11. The airbag assembly of claim 9, wherein said stamped metal is stamped cold rolled steel.

12. The airbag assembly of claim 9, wherein said molded plastic comprises 30% glass filled polybutyl terephthalate.

13. A method for attaching an airbag plate to an instrument panel upper in an airbag assembly, the method comprising the steps of:
forming an airbag plate having at least one raised flat region, a flat region between a grooved surface and said at least one raised flat region, and a push retainer region within each one of said at least one raised flat regions; and
irreversibly mating one of at least one bosses contained on an engine side of the instrument panel upper within each one of said at least one push retainer regions.

14. The method of claim 13, wherein the step of forming an airbag plate comprises the step of forming an airbag plate having a grooved region, at least one raised flat region, a flat region between said grooved surface, at least one clip region, and said at least one raised flat region, and a push retainer region within each one of said at least one raised flat regions.

15. The method of claim 14, wherein the step of irreversibly mating comprises the steps of:
mating said grooved region within a flange on said instrument panel upper and mating a clip of said instrument panel upper within one of said at least one corresponding clip regions; and
irreversibly mating one of at least one bosses contained on an engine side of an instrument panel upper within a corresponding one of a said at least one push retainer regions.

16. The method of claim 15 further comprising the step of attaching said grooved region to a flange on said instrument panel upper.

17. The method of claim 15, wherein the step of attaching said grooved region to a flange on said instrument panel upper comprises the step of attaching said grooved region to a flange on said instrument panel upper using a plurality of screws.

18. The method of claim 13, wherein the step of forming an airbag plate comprises the step of forming an airbag plate having a grooved region, at least one raised flat region, a flat region between said grooved region and said at least one raised flat region, at least one clip region, a base region, a sidewall region between said base region and said one of said at least one raised flat region, and a plurality of contact arms raised upwardly and inwardly from said base region at a first angle between approximately ten and thirty degrees relative to a horizontal axis defined by said base region, a first end of each of said plurality of contact arms defining a hole having a first diameter, wherein the diameter of said corresponding one of said at least one boss is sized slightly larger than said first diameter.

19. The method of claim 13, wherein the step of forming an airbag plate comprises the step of stamping an airbag plate having a grooved region, at least one raised flat region, a flat region between said grooved region and said at least one raised flat region, at least one clip region, a base region, a sidewall region between said base region and said one of said at least one raised flat region, and a flange raised upwardly and inwardly from said base region at a first angle between approximately ten and thirty degrees relative to a horizontal axis defined by said base region, said flange having a hole within said flange having a first diameter, wherein said first diameter is sized slightly smaller than the diameter of said corresponding one of said at least one boss.

20. The method of claim 13, wherein the step of forming an airbag plate comprises the step of stamping an airbag plate having a grooved region, at least one raised flat region, a flat region between said grooved region and said at least one raised flat region, at least one clip region, a base region, a sidewall region between said base region and said one of said at least one raised flat region, and a flange raised upwardly and inwardly from said base region at a first angle between approximately ten and thirty degrees relative to a horizontal axis defined by said base region, said flange having a plurality of barbs at a first end opposite said base region, the end of said barbs defining a hole within said flange having a first diameter, wherein said first diameter is sized slightly smaller than the diameter of said corresponding one of said at least one boss.

* * * * *